(12) United States Patent
Kirshman et al.

(10) Patent No.: US 8,720,181 B1
(45) Date of Patent: May 13, 2014

(54) ROCKET ENGINE IGNITION FLAME REDUCTION SYSTEM

(75) Inventors: David James Kirshman, Huntington Beach, CA (US); Darren Alec Fricker, Fountain Valley, CA (US); James Francis LeBar, Castle Rock, CO (US)

(73) Assignee: The Boeing Company, Chicago, IL (US)

( * ) Notice: Subject to any disclaimer, the term of this patent is extended or adjusted under 35 U.S.C. 154(b) by 765 days.

(21) Appl. No.: 12/869,211

(22) Filed: Aug. 26, 2010

(51) Int. Cl.
*B63H 11/00* (2006.01)

(52) U.S. Cl.
USPC ............ 60/204; 60/200.1; 60/253; 244/171.6

(58) Field of Classification Search
CPC ...................................... B64G 1/002
USPC ........... 60/200.1, 201, 204, 219, 253; 244/63, 244/158.1, 171.6, 114 B, 171.3
See application file for complete search history.

(56) References Cited

U.S. PATENT DOCUMENTS

| | | | | | |
|---|---|---|---|---|---|
| 3,363,508 | A | * | 1/1968 | Stahmer | 89/1.818 |
| 4,733,751 | A | * | 3/1988 | Piesik | 181/217 |
| 4,805,402 | A | * | 2/1989 | Power et al. | 60/253 |
| 4,836,775 | A | * | 6/1989 | Heithoff et al. | 432/112 |
| 4,932,607 | A | * | 6/1990 | Layton et al. | 244/63 |
| 4,964,340 | A | * | 10/1990 | Daniels et al. | 102/377 |
| 4,998,690 | A | * | 3/1991 | Wustefeld | 244/171.6 |
| 5,129,602 | A | * | 7/1992 | Leonard | 244/172.2 |
| 5,217,187 | A | * | 6/1993 | Criswell | 244/171.3 |
| 5,350,138 | A | * | 9/1994 | Culbertson et al. | 244/159.6 |
| 5,362,273 | A | * | 11/1994 | Pfeiffer et al. | 454/63 |
| 5,405,421 | A | * | 4/1995 | Swisher, Jr. | 55/284 |
| 5,529,264 | A | * | 6/1996 | Bedegrew et al. | 244/118.2 |
| 5,542,250 | A | * | 8/1996 | Ball et al. | 60/315 |
| 5,845,875 | A | * | 12/1998 | Deel | 244/63 |
| 5,924,648 | A | * | 7/1999 | Ellinthorpe | 244/63 |
| 5,974,939 | A | * | 11/1999 | Deel | 89/1.8 |
| 6,321,631 | B1 | * | 11/2001 | Deel | 89/1.8 |
| 6,499,696 | B1 | * | 12/2002 | Malinowski | 244/171.1 |
| 7,000,377 | B1 | | 2/2006 | Knight | |
| 7,254,936 | B1 | | 8/2007 | Knight | |
| 7,810,310 | B2 | * | 10/2010 | Yoshida | 60/39.464 |
| 7,811,089 | B2 | * | 10/2010 | Bond | 434/67 |
| 2008/0016846 | A1 | | 1/2008 | Spadaccini | |

OTHER PUBLICATIONS

Kirschman, "CFD Analysis and Mitigation of the Delta IV RS-68 Pre-ignition Hydrogen Combustion and Engine Start Transient", 2009, The Boeing Company, pp. 1-21.

Shih et al., "A New k-e Eddy Viscosity Model for High Reynolds Number Turbulent Flows", 1995, Computers Fluids vol. 24 No. 3, pp. 227-238.

Svehla et al., "Fortran IV Computer for Calculation of Thermodynamic and Transport Properties of Complex Chemical Systems", NASA Technical Note D-7056, Jan. 1973, pp. 1-183.

* cited by examiner

*Primary Examiner* — William H Rodriguez
(74) *Attorney, Agent, or Firm* — Yee & Associates, P.C.

(57) ABSTRACT

A method and apparatus for launching a space vehicle. Operation of a first portion of a plurality of rocket engines associated with a space vehicle is started such that a flow of a gas is initiated through a duct system under the plurality of rocket engines. The gas is located in an area near the plurality of rocket engines. Operation of a second portion of the plurality of rocket engines associated with the space vehicle is started after the flow of the gas begins traveling through the duct system to launch the space vehicle.

20 Claims, 9 Drawing Sheets

ROCKET ENGINE IGNITION FLAME REDUCTION SYSTEM

GOVERNMENT LICENSE RIGHTS

This application was made with Government support under contract number FA8816-06-C-0001 awarded by the Department of Defense. The Government has certain rights in this application.

BACKGROUND INFORMATION

1. Field

The present disclosure relates generally to spacecraft and, in particular, to launch vehicles. Still more particularly, the present disclosure relates to a method and apparatus for reducing and managing flames that occur during ignition of rocket engines.

2. Background

A spacecraft is used for a number of different purposes. These purposes include communications, earth observation, meteorology, navigation, planetary exploration, and other types of purposes. Spacecraft may be manned or unmanned. Spacecraft include, for example, a satellite, a space shuttle, and other suitable types of spacecraft.

Most spacecraft are unable to reach outer space with their own propulsion systems. Typically, a launch vehicle carries the spacecraft into space. The space vehicle is a payload for the launch vehicle.

A launch vehicle is a structure with a number of rocket engines and is designed to carry a payload. Launch vehicles may be reusable or expendable, depending on the particular design. Launch vehicles also may use a number of different types of propellants. The propellants may be solid or liquid. Commonly used liquid propellants for rocket engines include hydrogen and oxygen.

With rocket engines using these types of cryogenic liquid propellants, the components of the rocket engines are typically cooled before igniting the rocket engines. This type of cooling is also referred to as preconditioning. The preconditioning of a rocket engine may be performed by, for example, pumping the propellants in liquid form through the engines without igniting the propellants. After the rocket engines have been preconditioned, the rocket engines may be ignited to launch the spacecraft.

When liquid hydrogen is used as the propellant for these types of rocket engines, the liquid hydrogen turns into hydrogen gas during preconditioning. With the generation of hydrogen gas, the hydrogen gas is often collected prior to ignition of the rocket engines. The collection of gas is performed using a gas collection system in the launch vehicle and/or in the launch pad structure. This collection of the hydrogen gas reduces the possibility of gas accumulation, an undesired ignition, a large flame engulfing the launch vehicle, a deflagration, and/or a detonation of the gases.

These collection systems, however, increase the expense and weight of a launch vehicle. The increased cost is especially undesirable when a launch vehicle is an expendable launch vehicle.

Therefore, it would be advantageous to have a method and apparatus that takes into account the issues discussed above, as well as other possible issues.

SUMMARY

In one advantageous embodiment, a method is provided for launching a space vehicle. Operation of a first portion of a plurality of rocket engines associated with a space vehicle is started such that a flow of a gas is initiated through a duct system under the plurality of rocket engines. The gas is located in an area near the plurality of rocket engines. Operation of a second portion of the plurality of rocket engines associated with the space vehicle is started after the flow of the gas begins traveling through the duct system to launch the space vehicle.

In another advantageous embodiment, a method is provided for launching a space vehicle. A gas located in an area near a number of rocket engines associated with the space vehicle is moved through a duct system under the number of rocket engines away from the number of rocket engines using a gas movement system associated with the number of rocket engines. Operation of the number of rocket engines is started after the gas has started moving through the duct system to launch the space vehicle.

In yet another advantageous embodiment, an apparatus comprises a duct system and a gas movement system. The duct system is associated with a launch pad configured to launch a space vehicle. The gas movement system is configured to move a gas in an area near a number of rocket engines through the duct system away from the number of rocket engines.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

The different advantageous embodiments recognize and take into account a number of different considerations. The different advantageous embodiments recognize and take into account that, in some cases, rocket engines do not use a collection system to reclaim and/or recycle substantially all of the hydrogen gas used to precondition the engines. In other words, a portion of the hydrogen gas may be expelled from the rocket engines. With these types of rocket engines, the expelled hydrogen gas may be ignited.

The different advantageous embodiments recognize and take into account that the expelled hydrogen gas may be ignited to prevent accumulation and undesired detonation of the combustible mixture of the expelled hydrogen gas with oxygen. In some cases, a separate set of igniters external to the rocket engines may be used to burn the expelled hydrogen gas. In other words, the different advantageous embodiments recognize and take into account that after preconditioning of the engines has occurred, activation of a separate set of igniters may occur within a period of time that is short enough to reduce the possibility that the gas may accumulate or detonate.

The different advantageous embodiments recognize and take into account that as the size and number of the rocket engines increase in a launch vehicle, the size of the flame generated from igniting the expelled gas may also increase. An increased flame size may be undesirable. The different advantageous embodiments recognize and take into account that the flame generated may rise upwards near the launch vehicle.

The different advantageous embodiments recognize and take into account that a duct system may be present in the launch pad. The duct system may aid in channeling the flame away from the launch vehicle. The different advantageous embodiments recognize and take into account that even with channeling the flame away from the launch vehicle, some of the gas may ignite in a manner that still causes the flame to travel upward and engulf the launch vehicle.

Thus, the different advantageous embodiments provide a method and apparatus for reducing the amount of combusting gases generated during ignition of the rocket engines in the area near a space vehicle and/or launch vehicle carrying the space vehicle. In one advantageous embodiment, operation of a first portion of a plurality of rocket engines is started such that a gas near the plurality of rocket engines moves through a duct system under the plurality of rocket engines. The gas, in these examples, is located in an area near the plurality of rocket engines and is flammable. The operation of a second portion of the plurality of rocket engines is started after the gas begins moving through the duct system.

In still other advantageous embodiments, a gas movement system may be associated with the launch pad. This gas movement system is configured to move the gas through the duct system and ignite the gas in these illustrative examples.

Figure 1:
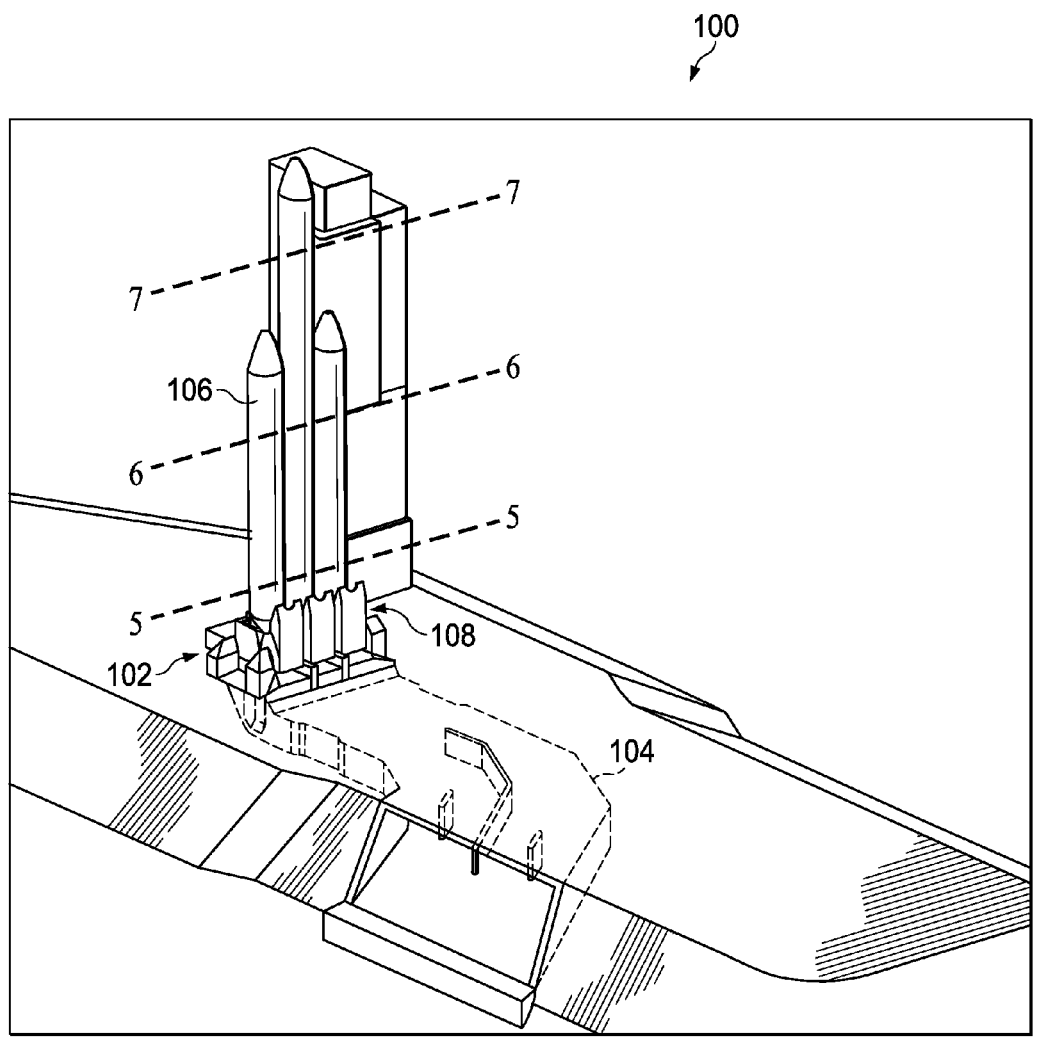
FIG. 1 is an illustration of a launch environment in accordance with an advantageous embodiment.

With reference now to FIG. 1, an illustration of a launch environment is depicted in accordance with an advantageous embodiment. Launch environment 100 includes launch pad 102 and launch vehicle 106. Launch vehicle 106 sits on launch pad 102. Launch vehicle 106 has rocket engines 108 and may carry a payload, such as a spacecraft. A spacecraft may also be referred to as a space vehicle. Duct system 104 is located in launch pad 102 below rocket engines 108.

In these illustrative examples, rocket engines 108 may be operated in a staggered fashion to reduce the size of the flame that may occur in the area near launch vehicle 106. The staggered ignition of rocket engines 108 is performed in a manner such that gas near the rocket engines moves through duct system 104 away from rocket engines 108. As a result, the flame in the area near the launch vehicle generated by ignition of rocket engines 108 and the expelled combusting gas is reduced.

In these illustrative examples, the gas near rocket engines 108 is a gas resulting from preconditioning rocket engines 108 for ignition. Additionally, duct system 104 may include a mechanism to move the gas from near rocket engines 108 through duct system 104 away from rocket engines 108. In the illustrative examples, in launch environment 100, launch vehicle 106 may be safely launched and a payload carried by launch vehicle 106 may operate as desired.

Figure 2:
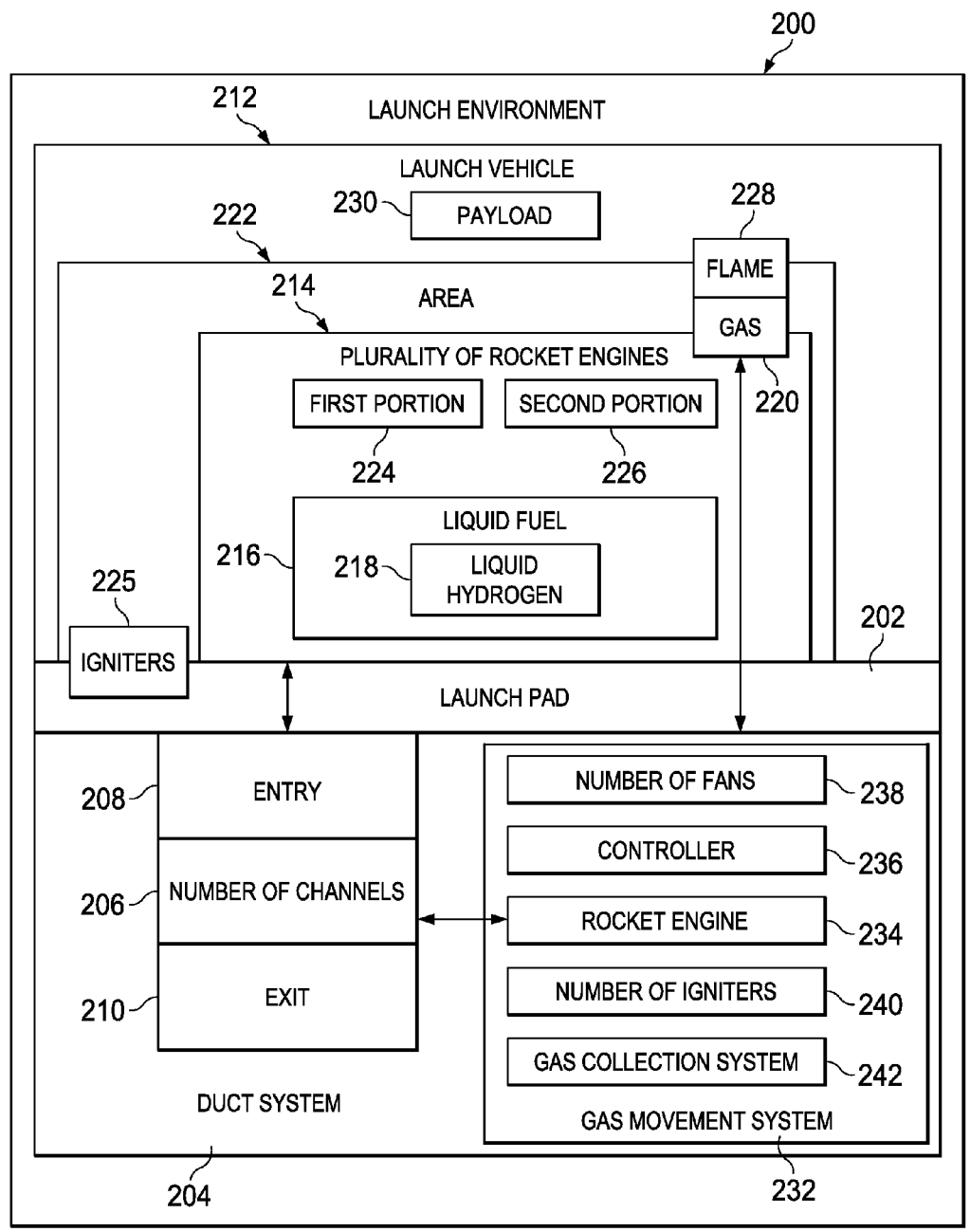
FIG. 2 is an illustration of a launch environment in accordance with an advantageous embodiment.

With reference now to FIG. 2, an illustration of a launch environment is depicted in accordance with an advantageous embodiment. Launch environment 100 in FIG. 1 is an example of one implementation for launch environment 200 in FIG. 2. In this illustrative example, launch environment 200 includes launch pad 202 and duct system 204. Duct system 204 is associated with launch pad 202.

A first component may be considered to be associated with a second component by being secured, attached, bonded, fastened, and/or mounted to the second component. Further, the first component may be associated with the second component by being connected to the second component in some other suitable manner. Still further, the first component may be connected to the second component by using a third component. The first component may also be considered to be associated with the second component by being formed as part of and/or an extension of the second component.

In these depicted examples, duct system 204 has number of channels 206 that extends through launch pad 202. Duct system 204 has entry 208 and exit 210 for number of channels 206. A number, as used herein with reference to an item, means one or more items. For example, a number of channels may be one or more channels.

As depicted, launch vehicle 212 is located on launch pad 202. Launch vehicle 212 has plurality of rocket engines 214 with duct system 204 being under plurality of rocket engines 214. In particular, plurality of rocket engines 214 is located over entry 208 of duct system 204.

In these illustrative examples, liquid fuel 216 is pumped through plurality of rocket engines 214 to precondition plurality of rocket engines 214 for ignition. Liquid fuel 216 takes the form of liquid hydrogen 218 in these examples. Ignition is the firing up or starting of plurality of rocket engines 214 in which liquid fuel 216 is burned. Liquid fuel 216 is burned by combining liquid fuel 216 with an oxidizing agent and then burned. Oxidizing agents may include liquid oxygen, air, ozone, hydrogen peroxide, nitrogen tetroxide, or other formulation. In other words, ignition is the beginning of burning of liquid fuel 216.

In these illustrative examples, liquid hydrogen 218 cools the temperature of different components in plurality of rocket engines 214. Liquid hydrogen 218 forms gas 220 in area 222 near plurality of rocket engines 214. Area 222 near plurality of rocket engines 214 may be inside and/or outside of plurality of rocket engines 214.

The different advantageous embodiments start plurality of rocket engines 214 in a staggered fashion to initiate the movement of gas 220 through duct system 204. In particular, the movement of gas 220 is through entry 208 to number of channels 206 towards exit 210. In this manner, gas 220 is moved away from plurality of rocket engines 214. The movement of gas 220 away from plurality of rocket engines 214 may occur as gas 220 is ignited through the ignition of plurality of rocket engines 214.

In some illustrative examples, the movement of gas 220 away from plurality of rocket engines 214 may occur as gas 220 is ignited by igniters 225. Igniters 225 are separate from plurality of rocket engines 214. For example, igniters 225 may be located external to plurality of rocket engines 214.

The staggered start of plurality of rocket engines 214 means that different rocket engines in plurality of rocket engines 214 are started at different times. In these illustrative examples, first portion 224 of plurality of rocket engines 214 is started such that gas 220 near plurality of rocket engines 214 moves through duct system 204 under plurality of rocket engines 214. Second portion 226 of plurality of rocket engines 214 is then started after gas 220 begins moving through duct system 204.

In starting first portion 224, each rocket engine in first portion 224 of plurality of rocket engines 214 may be started at substantially the same time or one after another, depending on the particular implementation. In other words, one rocket engine may be started after another rocket engine in plurality of rocket engines 214 until all of the rocket engines are started.

In this manner, flame 228, generated by starting plurality of rocket engines 214, may be reduced in size. The reduction of the size of flame 228 may be such that payload 230, carried by launch vehicle 212, may be safely launched and may operate as desired.

In the different illustrative examples, gas movement system 232 may be associated with duct system 204. Gas movement system 232 may move gas 220 through duct system 204 away from plurality of rocket engines 214. Additionally, gas movement system 232 may ignite gas 220 as it moves through duct system 204.

Gas movement system 232 may take a number of different forms. For example, without limitation, gas movement system 232 may comprise rocket engine 234 and controller 236. Rocket engine 234 may be located in number of channels 206 or otherwise positioned to cause gas 220 to move through number of channels 206 in duct system 204.

Controller 236 is configured to control the operation of rocket engine 234. In other illustrative examples, gas movement system 232 may include number of fans 238 and/or number of igniters 240 controlled by controller 236. In still other illustrative examples, gas collection system 242 may be used instead of number of igniters 240 to collect gas 220.

In these illustrative examples, gas movement system 232 may be used in place of or in addition to the staggered start of plurality of rocket engines 214. Gas movement system 232 may be especially useful when launch vehicle 212 only has a single rocket engine instead of plurality of rocket engines 214.

The illustration of launch environment 200 in FIG. 2 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, a space vehicle may be located on launch pad 202 instead of launch vehicle 212. The space vehicle may be, for example, a shuttle.

The different advantageous embodiments may be applied to a space vehicle that has plurality of rocket engines 214. Additionally, in some illustrative examples, more than one rocket engine may be present when gas movement system 232 is used, depending on the particular implementation. In other illustrative examples, gas movement system 232 may include a number of propulsive devices located in duct system 204 in addition to or in the place of number of fans 238.

Figure 3:
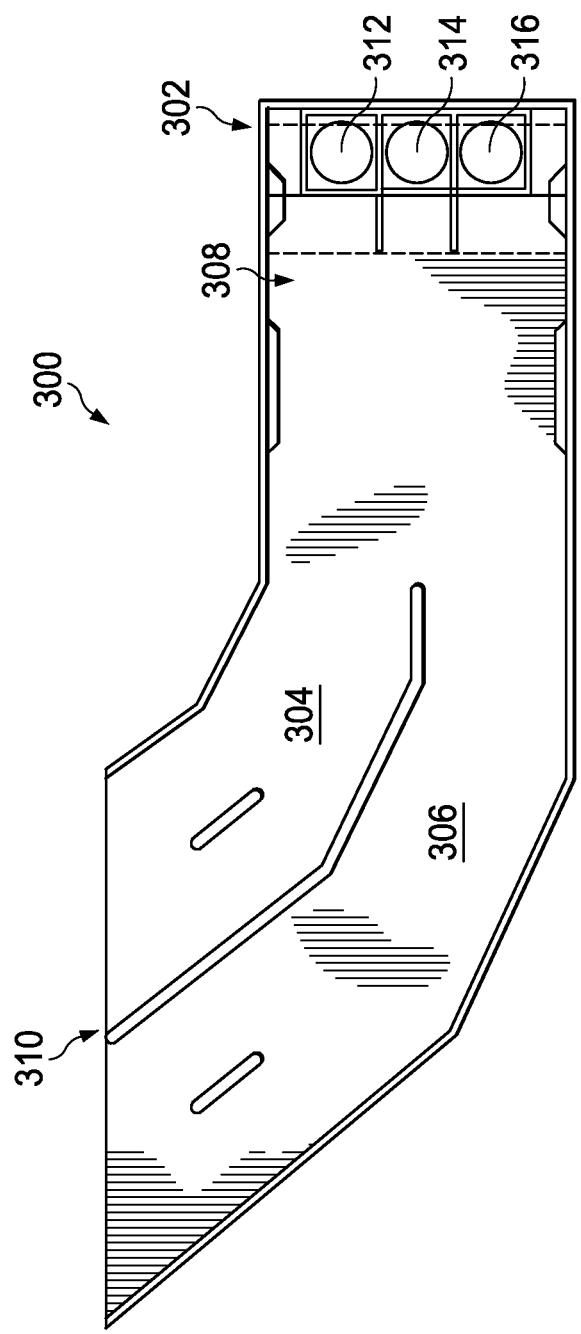
FIG. 3 is an illustration of a duct system associated with a launch pad in accordance with an advantageous embodiment.

With reference now to FIG. 3, an illustration of a duct system associated with a launch pad is depicted in accordance with an advantageous embodiment. In this illustrative example, duct system 300 is an example of one implementation for duct system 204 in FIG. 2. As depicted, duct system 300 has channel 304 and channel 306. Further, duct system 300 has entry 308 and exit 310.

Duct system 300 is associated with launch pad 302 in this depicted example. Starboard rocket engine 312, center rocket engine 314, and port rocket engine 316 are located over launch pad 302 in this illustrative example. Of course, in other examples, more or fewer rocket engines may be present.

Starboard rocket engine 312, center rocket engine 314, and port rocket engine 316 may be preconditioned using a liquid fuel. The gas resulting from this preconditioning is moved away from starboard rocket engine 312, center rocket engine 314, and port rocket engine 316 using duct system 300. For example, the gas enters duct system 300 through entry 308 and moves through at least one of channel 304 and channel 306 towards exit 310.

Starting starboard rocket engine 312, center rocket engine 314, and port rocket engine 316 in a staggered fashion involves starting one rocket engine before the other rocket engines. For example, center rocket engine 314 is ignited first. Starboard rocket engine 312 and port rocket engine 316 may then be started at some period of time after the ignition of center rocket engine 314.

Figure 4:
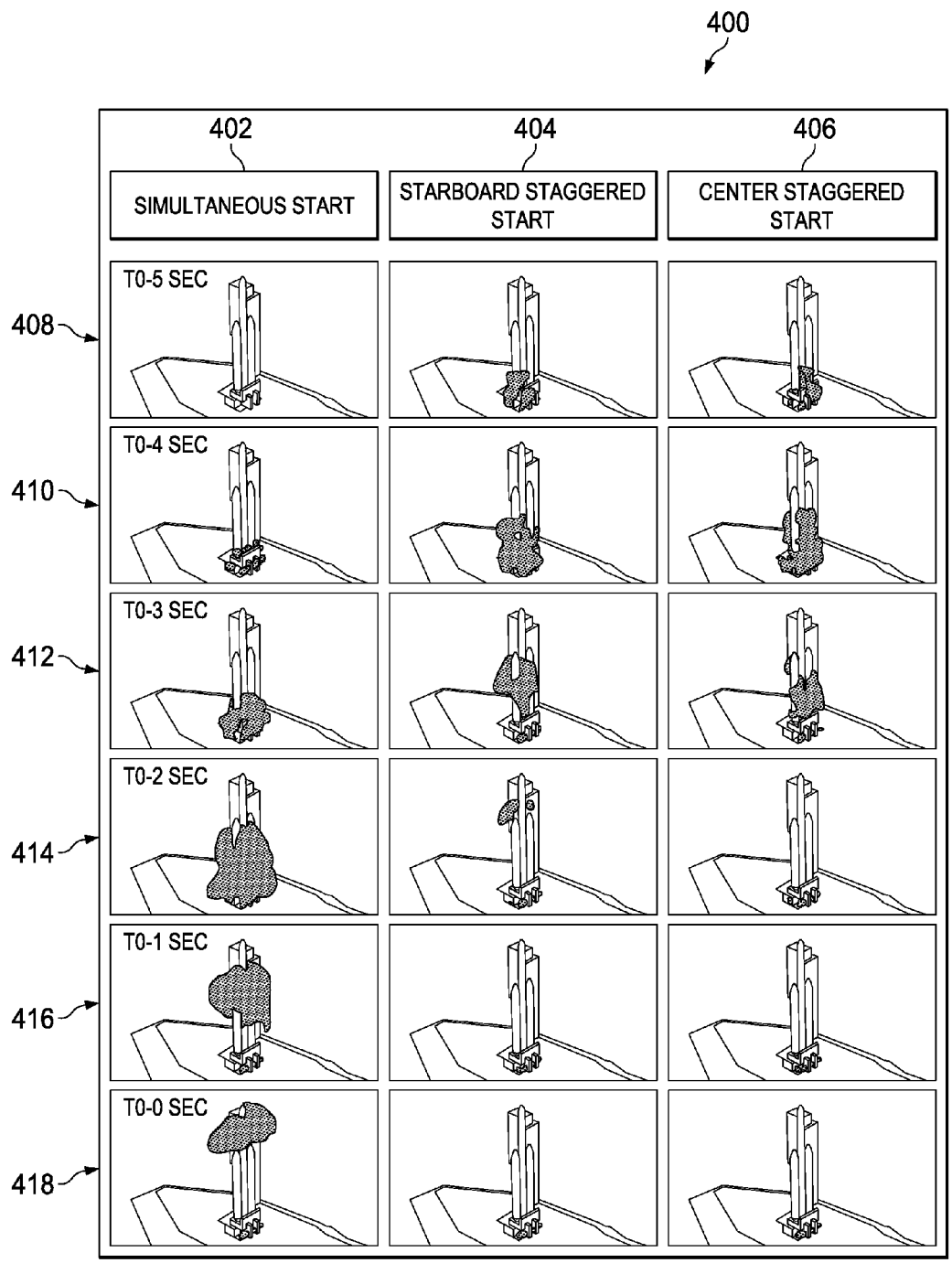
FIG. 4 is an illustration of a comparison of a flame formed near a launch vehicle after ignition for different types of ignitions in accordance with an advantageous embodiment.

With reference now to FIG. 4, an illustration of a comparison of a flame formed near a launch vehicle after ignition for different types of ignitions is depicted in accordance with an advantageous embodiment. In this illustrative example, table 400 presents a comparison of a flame formed near a launch vehicle after ignition for simultaneous start 402, starboard staggered start 404, and center staggered start 406.

In this depicted example, the flame formed near the launch vehicle comprises a gas mixture of hydrogen gas and air. In table 400, the flame is presented as an iso-surface for the flame. This iso-surface corresponds to the gas mixture having a temperature of about 1,250 degrees Fahrenheit. In other words, the portion of the gas mixture with a temperature above 1,250 degrees Fahrenheit is represented as being within the iso-surface.

In this illustrative example, the launch vehicle has a configuration in which the launch vehicle has three rocket engines. These three rocket engines include a starboard rocket engine, a center rocket engine, and a port rocket engine.

Simultaneous start 402 indicates a progression for the heated gas formed near the launch vehicle when all three rocket engines are started simultaneously. As depicted, starboard staggered start 404 indicates a progression for the heated gas formed near the launch vehicle when the starboard rocket engine is started about two seconds earlier than the center rocket engine and port rocket engine. Further, center staggered start 406 indicates a progression for the heated gas formed near the launch vehicle when the center rocket engine is started about two seconds earlier than the starboard rocket engine and port rocket engine.

Table 400 identifies the progression for the heated gas formed near the launch vehicle with respect to time T0. Time T0 is the time at which the launch vehicle lifts off. Time T0-5 408 is about five seconds before the time for lift-off. Time T0-4 410 is about four seconds before the time for lift-off. Time T0-3 412 is about three seconds before the time for lift-off. Time T0-2 414 is about two seconds before the time for lift-off. Time T0-1 416 is about one second before the time for lift-off. Time T0-0 418 is time T0.

In this illustrative example, time T0-5 408 for simultaneous start 402 is about 0.5 seconds after the three rocket engines are started. Time T0-5 408 for starboard staggered start 404 is about 2.5 seconds after the starboard rocket engine is started. Time T0-5 408 for center staggered start 406 is about 2.5 seconds after the center rocket engine is started.

As depicted in this example, both starboard staggered start 404 and center staggered start 406 cause less heated gas to form near the launch vehicle prior to lift-off. Further, the heated gas having a temperature of about 1,250 degrees Fahrenheit has dissipated at time T0-1 416 for starboard staggered start 404 and at time T0-2 414 for center staggered start 406. However, this heated gas is still present near the launch vehicle at the time of lift-off for simultaneous start 402.

Figure 5:
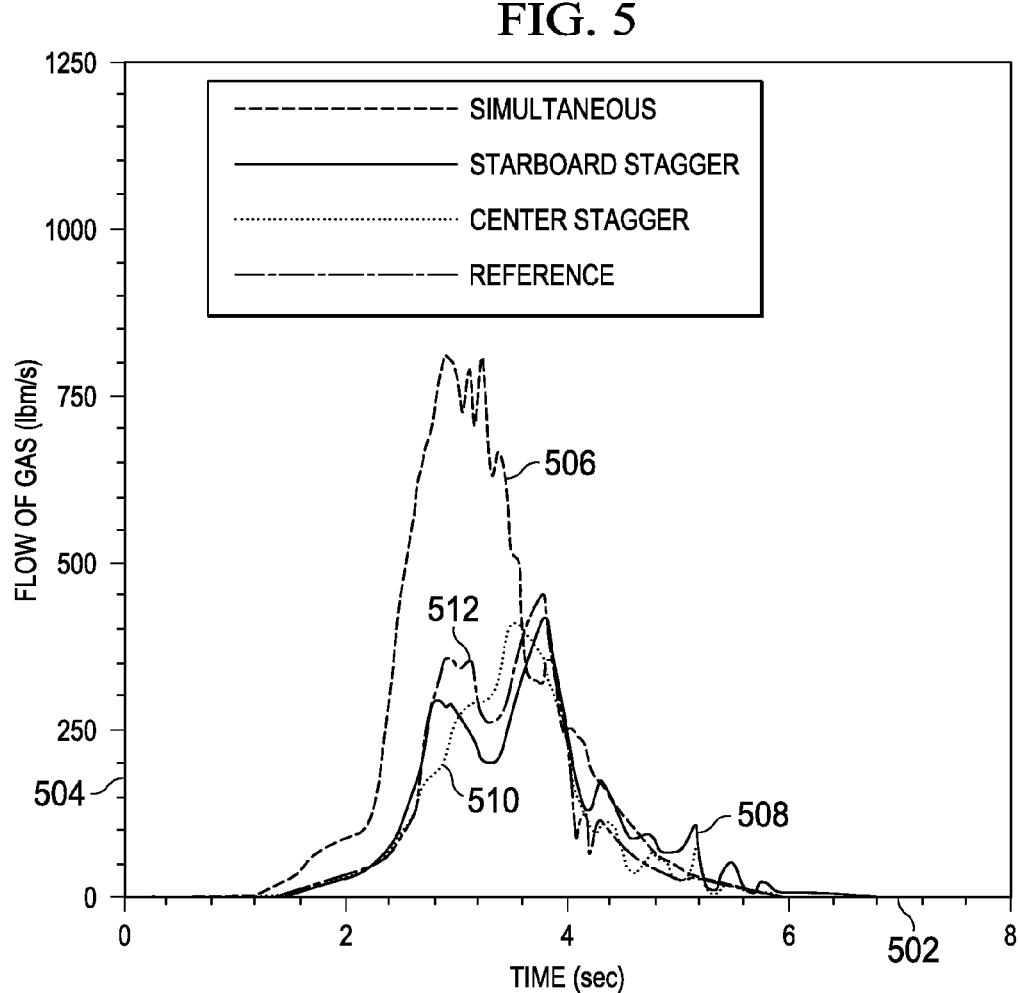
FIG. 5 is an illustration of a graph comparing a flow of a gas to a height for a launch vehicle for different types of rocket engine starts in accordance with an advantageous embodiment.
Figure 6:
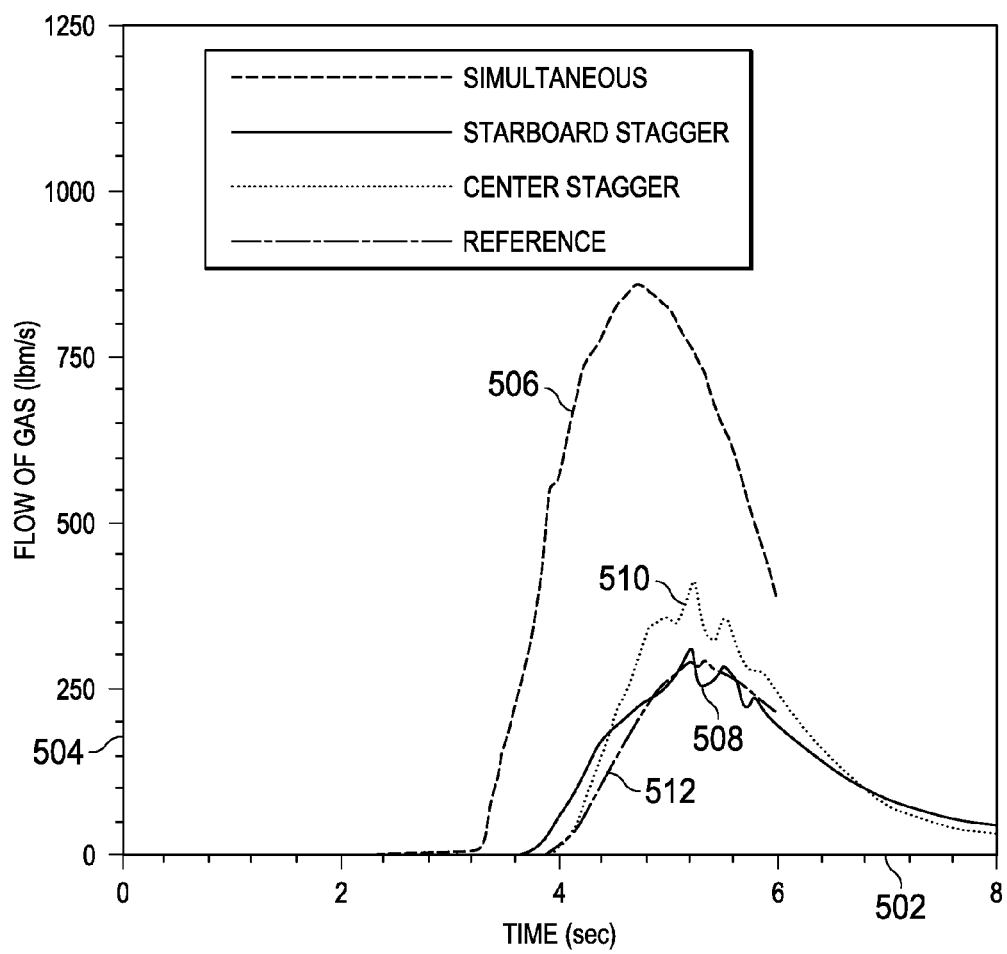
FIG. 6 is an illustration of a graph comparing a flow of a gas to a height for a launch vehicle for different types of rocket engine starts in accordance with an advantageous embodiment.
Figure 7:
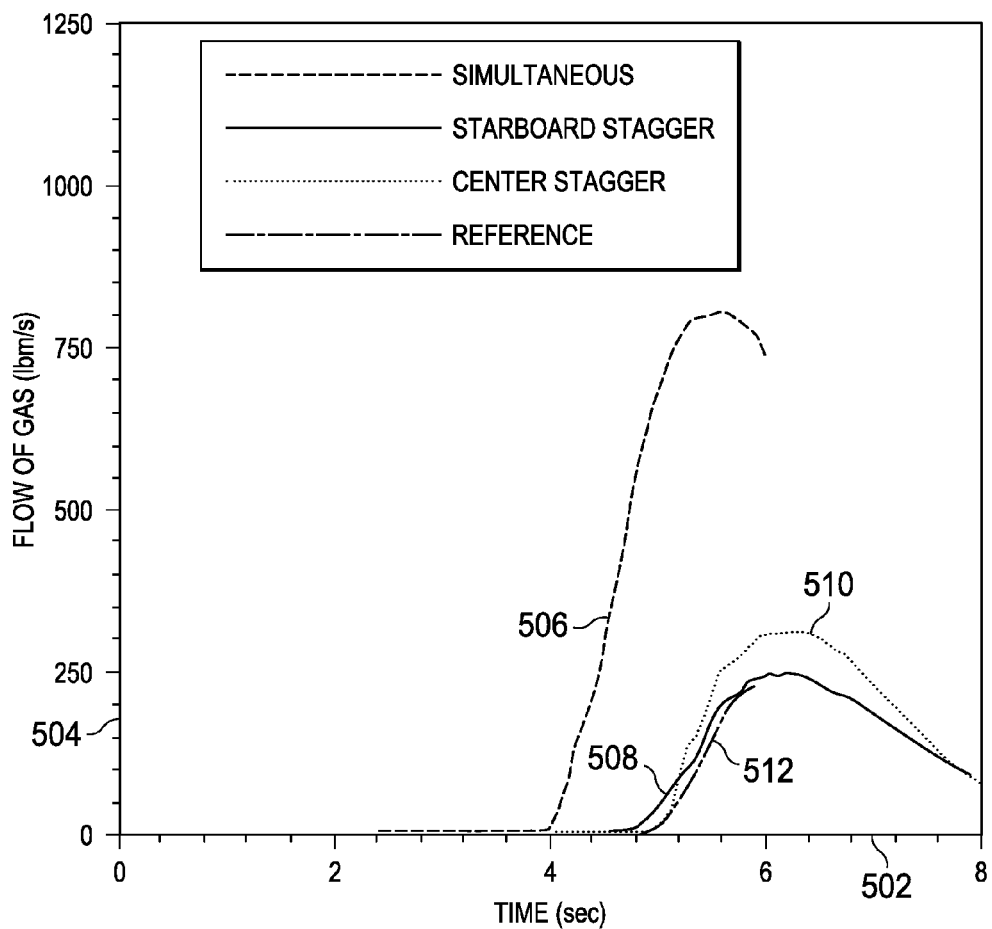
FIG. 7 is an illustration of a graph comparing a flow of a gas to a height for a launch vehicle for different types of rocket engine starts in accordance with an advantageous embodiment.

With reference now to FIGS. 5-7, illustrations of graphs comparing the flow of gases at different launch vehicle elevations for different types of rocket engine starts are depicted in accordance with an advantageous embodiment. Graph 500 in FIG. 5, graph 600 in FIG. 6, and graph 700 in FIG. 7 each compare the flow of gas that reaches different heights for launch vehicle 106 in FIG. 1 with different types of starts for rocket engines 108 in FIG. 1.

In these illustrative examples, graph 500 in FIG. 5, graph 600 in FIG. 6, and graph 700 in FIG. 7 each have horizontal axis 502 and vertical axis 504. Horizontal axis 502 is time. Vertical axis 504 is the flow of gas in pound-mass per second.

Further, in these illustrative examples, each of the graphs in FIGS. 5-7 has simultaneous curve 506, starboard staggered curve 508, and center staggered curve 510. Simultaneous curve 506 is for a simultaneous start for rocket engines 108 in FIG. 1. Starboard staggered curve 508 is for starting the starboard rocket engine in rocket engines 108 before the other two rocket engines. Center staggered curve 510 is for starting the center rocket engine in rocket engines 108 before the other two rocket engines.

Additionally, the graphs in FIGS. 5-7 also have reference curve 512. Reference curve 512 is for a configuration for launch vehicle 106 in FIG. 1 in which launch vehicle 106 has only one rocket engine without any type of additional gas movement system.

Turning now to FIG. 5, graph 500 identifies the flow of gas that reaches a height for launch vehicle 106 indicated by lines 5-5 in FIG. 1 over time for each of the different types of starts for the rocket engines of launch vehicle 106 in FIG. 1.

Turning now to FIG. 6, graph 600 identifies the flow of gas that reaches a height for launch vehicle 106 indicated by lines 6-6 in FIG. 1 over time for each of the different types of starts for the rocket engines of launch vehicle 106 in FIG. 1.

Turning now to FIG. 7, graph 700 identifies the flow of gas that reaches a height for launch vehicle 106 indicated by lines 7-7 in FIG. 1 over time for each of the different types of starts for the rocket engines of launch vehicle 106 in FIG. 1.

As depicted in graph 500 in FIG. 5, graph 600 in FIG. 6, and graph 700 in FIG. 7, a staggered start for igniting rocket engines reduces the flow of gas that reaches different portions of a launch vehicle. Additionally, as depicted in this example, the staggered start for igniting three rocket engines produces a flow of gas that is similar to the flow of gas produced by a single rocket engine without any additional gas movement system. Further, substantially equivalent or additional reductions in the flow of gas that reaches the different portions of the launch vehicle may be achieved by using a gas movement system to move the expelled gas away from the launch vehicle or by using a gas movement system with the staggered start ignition of the rocket engines. In these illustrative examples, the gas is hydrogen.

Figure 8:
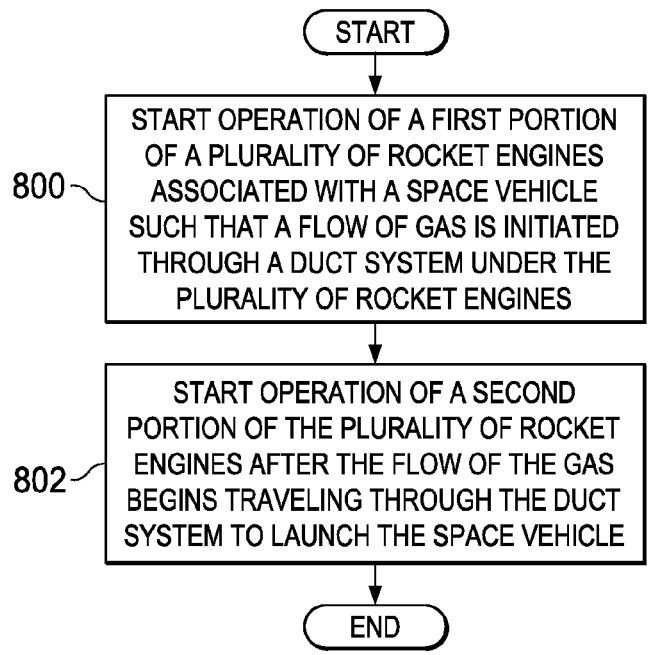
FIG. 8 is an illustration of a flowchart of a process for launching a space vehicle in accordance with an advantageous embodiment.

With reference now to FIG. 8, an illustration of a flowchart of a process for launching a space vehicle is depicted in accordance with an advantageous embodiment. The process illustrated in FIG. 8 may be implemented within launch environment 200 in FIG. 2.

The process begins by starting operation of a first portion of a plurality of rocket engines associated with a space vehicle such that a flow of gas is initiated through a duct system under the plurality of rocket engines (operation 800). The space vehicle may be, for example, launch vehicle 212 in FIG. 2. The duct system may be, for example, duct system 204 in FIG. 2. The gas is located in an area near the plurality of rocket engines. The gas may be, for example, gas 220 in FIG. 2.

The process then starts operation of a second portion of the plurality of rocket engines after the flow of the gas begins traveling through the duct system to launch the space vehicle (operation 802), with the process terminating thereafter. At some period of time after the start of the second portion of the plurality of rocket engines, the space vehicle lifts off.

Figure 9:
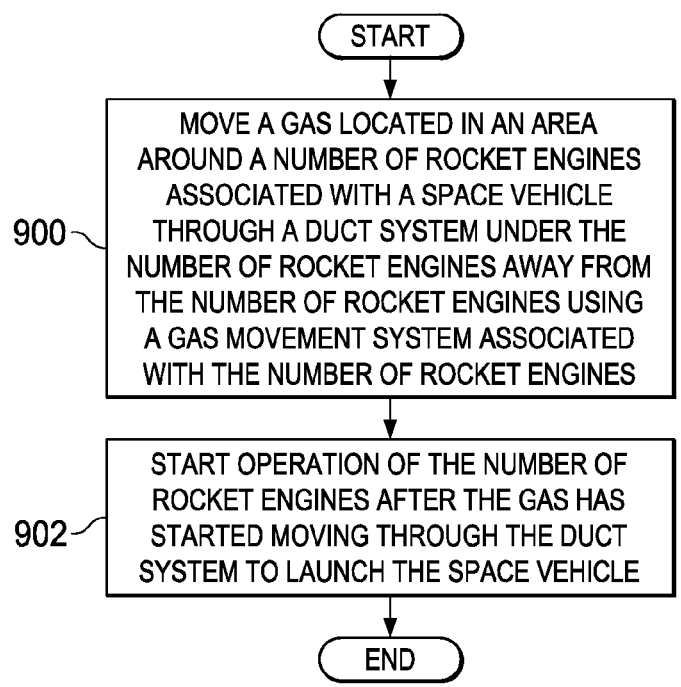
FIG. 9 is an illustration of a flowchart of a process for launching a space vehicle in accordance with an advantageous embodiment.

With reference now to FIG. 9, an illustration of a flowchart of a process for launching a space vehicle is depicted in accordance with an advantageous embodiment. The process illustrated in FIG. 9 may be implemented within launch environment 200 in FIG. 2.

The process begins by moving a gas located in an area near a number of rocket engines associated with a space vehicle through a duct system under the number of rocket engines away from the number of rocket engines using a gas movement system associated with the number of rocket engines (operation 900). The space vehicle may be, for example, launch vehicle 212 in FIG. 2. The duct system may be, for example, duct system 204 in FIG. 2.

Further, the gas movement system may be, for example, gas movement system 232 in FIG. 2. The gas located in the area near the number of rocket engines may be, for example, gas 220 in FIG. 2. This gas is a mixture comprising hydrogen gas and air in this illustrative example.

Thereafter, the process starts operation of the number of rocket engines after the gas has started moving through the duct system to launch the space vehicle (operation 902), with the process terminating thereafter. In some illustrative examples, in operation 902, the movement of gas through the duct system may be started by using the gas movement system to move the expelled gas. In these examples, a gas movement system may comprise, for example, without limitation, at least one of a rocket engine, a controller, a number of fans, and a gas collection system.

Figure 10:
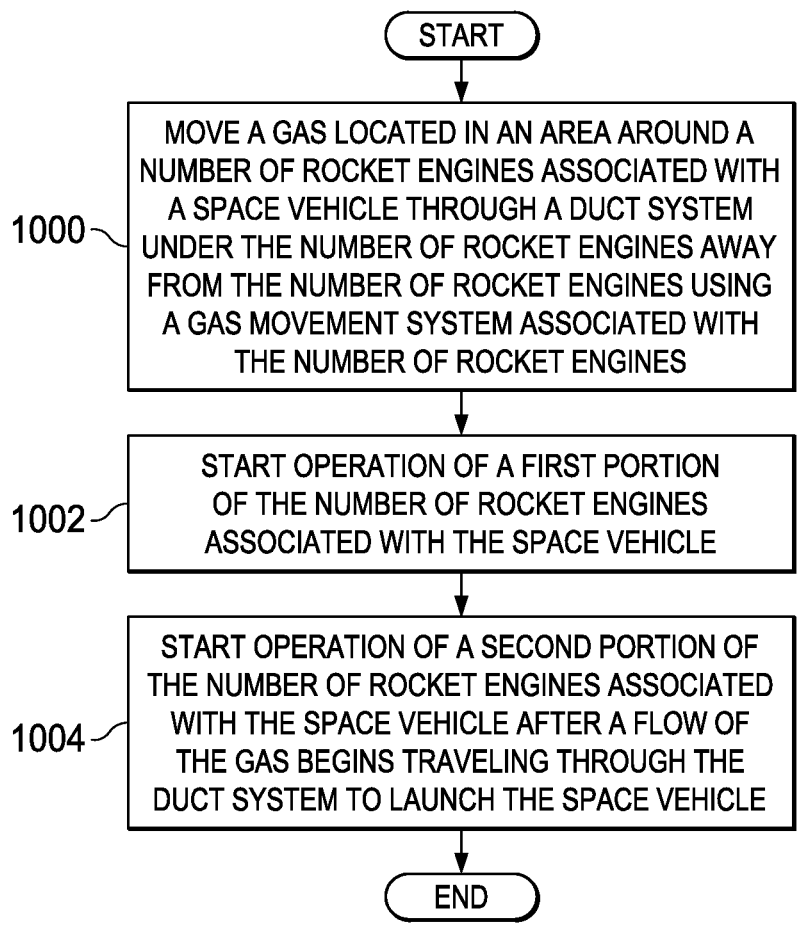
FIG. 10 is an illustration of a flowchart of a process for launching a space vehicle in accordance with an advantageous embodiment.

With reference now to FIG. 10, an illustration of a flowchart of a process for launching a space vehicle is depicted in accordance with an advantageous embodiment. The process illustrated in FIG. 10 may be implemented within launch environment 200 in FIG. 2.

The process begins by moving a gas located in an area near a number of rocket engines associated with a space vehicle through a duct system under the number of rocket engines away from the number of rocket engines using a gas movement system associated with the number of rocket engines (operation 1000). Thereafter, the process starts operation of a first portion of the number of rocket engines associated with the space vehicle (operation 1002).

Next, the process starts operation of a second portion of the number of rocket engines associated with the space vehicle after a flow of the gas begins traveling through the duct system to launch the space vehicle (operation 1004), with the process terminating thereafter.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Thus, the different advantageous embodiments provide a method and apparatus for reducing a flame in the area near a launch vehicle generated by the operation of rocket engines. In one advantageous embodiment, operation of a first portion of a plurality of rocket engines is started such that a gas near the rocket engines moves through a duct system under the plurality of rocket engines. The gas, in these examples, is located in an area near the plurality of rocket engines and is flammable. The operation of a second portion of the plurality of rocket engines is started after the gas begins moving through the duct system.

In still other advantageous embodiments, a gas movement system may be associated with a launch pad. This gas movement system is configured to move the gas through the duct system. The gas may then be ignited in these illustrative examples.

The different advantageous embodiments provide a method and apparatus for launching a space vehicle with a launch vehicle using a duct system and/or a gas movement system. With this type of system, a staggered start for ignition of rocket engines associated with the space vehicle generates a flame with a reduced size as compared to currently used systems. This reduction in size of the flame may increase the safety of a launch of the launch vehicle and the payload carried by the launch vehicle. In this manner, the payload may reach a desired destination and operate as desired. Further, the flame generated by the staggered start for the rocket engines may dissipate more quickly as compared to a simultaneous start of the rocket engines.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for launching a space vehicle, the method comprising:
    starting operation of a first portion of a plurality of rocket engines associated with the space vehicle such that a flow of a gas is initiated through a duct system within a launch pad under the plurality of rocket engines, wherein the gas is located in an area near the plurality of rocket engines;
    moving the gas through the duct system away from the plurality of rocket engines using a gas movement system associated with the duct system;
    igniting the gas as the gas moves through the duct system using the gas movement system; and
    starting operation of a second portion of the plurality of rocket engines associated with the space vehicle after the flow of the gas begins traveling through the duct system to launch the space vehicle.

2. The method of claim 1, wherein the step of starting the operation of the second portion of the plurality of rocket engines after the flow of the gas begins traveling through the duct system reduces a size of a flame occurring when the operation of the second portion of the plurality of rocket engines occurs.

3. The method of claim 1, wherein the step of starting the operation of the first portion of the plurality of rocket engines associated with the space vehicle such that the flow of the gas is initiated through the duct system within the launch pad under the plurality of rocket engines comprises:
    starting operation of the plurality of rocket engines in the first portion of the plurality of rocket engines associated with the space vehicle in a staggered order such that the flow of the gas travels through the duct system under the plurality of rocket engines.

4. The method of claim 1, wherein the gas comprises hydrogen.

5. The method of claim 1, wherein the gas movement system comprises a rocket engine located in the duct system.

6. The method of claim 1, wherein the space vehicle is a payload for a launch vehicle on which the plurality of rocket engines are located.

7. The method of claim 5, wherein the gas movement system comprises a controller configured to control the operation of the rocket engine.

8. The method of claim 7, wherein the step of igniting the gas as the gas moves through the duct system using the gas movement system comprises:
    igniting the rocket engine located in the duct system.

9. A method for launching a space vehicle, the method comprising:
    moving a gas located in an area near a number of rocket engines associated with the space vehicle through a duct system within a launch pad under the number of rocket engines away from the number of rocket engines using a gas movement system associated with the duct system, wherein the gas is a result of preconditioning the number of rocket engines;
    starting operation of the number of rocket engines after the gas has started moving through the duct system to launch the space vehicle; and
    igniting the gas as the gas moves through the duct system.

10. The method of claim 7, wherein the step of starting the operation of the number of rocket engines after the gas has started moving through the duct system to launch the space vehicle comprises:

starting operation of a first portion of the number of rocket engines associated with the space vehicle after a flow of the gas begins traveling through the duct system; and starting operation of a second portion of the number of rocket engines associated with the space vehicle subsequent to starting the operation of the first portion of the number of rocket engines.

11. The method of claim 9, wherein the step of starting the operation of the number of rocket engines after the gas has started moving through the duct system to launch the space vehicle comprises:

starting operation of all of the number of rocket engines at substantially the same time after the gas has started moving through the duct system.

12. The method of claim 9 wherein igniting the gas as the gas moves through the duct system comprises:

igniting the gas as the gas moves through the duct system using the gas movement system.

13. The method of claim 12, wherein the gas movement system comprises a rocket engine located in the duct system and a controller configured to control operation of the rocket engine.

14. The method of claim 9 further comprising:

igniting the gas as the gas moves through the duct system using a number of igniters.

15. An apparatus comprising:

a duct system within a launch pad configured to launch a space vehicle;

a gas movement system associated with the duct system and configured to move a gas in an area near a number of rocket engines through the duct system away from the number of rocket engines; and a rocket engine located in the duct system.

16. The apparatus of claim 15, wherein the gas movement system is configured to ignite the gas as the gas moves through the duct system.

17. The apparatus of claim 15, wherein the gas movement system comprises:

a controller configured to control operation of the rocket engine.

18. The apparatus of claim 15, wherein the gas movement system comprises:

a number of fans located in the duct system.

19. The apparatus of claim 18, wherein the gas movement system further comprises:

a number of igniters associated with the duct system.

20. The apparatus of claim 15, wherein the gas movement system comprises a gas collection system.

* * * * *